(12) United States Patent
Ladocsi et al.

(10) Patent No.: US 11,169,047 B2
(45) Date of Patent: Nov. 9, 2021

(54) METHOD FOR DETERMINING A NOISE OR VIBRATION RESPONSE OF A VEHICLE SUBASSEMBLY AND TEST APPARATUS FOR SAME

(71) Applicant: GM GLOBAL TECHNOLOGY OPERATIONS LLC, Detroit, MI (US)

(72) Inventors: Nicholas L. Ladocsi, Commerce Township, MI (US); Jonathan M. Pisaro, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 16/774,699

(22) Filed: Jan. 28, 2020

(65) Prior Publication Data

US 2021/0231523 A1    Jul. 29, 2021

(51) Int. Cl.
   *G01M 7/02*       (2006.01)
   *G01M 5/00*       (2006.01)

(52) U.S. Cl.
   CPC .......... *G01M 7/022* (2013.01); *G01M 5/0025* (2013.01); *G01M 5/0041* (2013.01); *G01M 5/0066* (2013.01); *G01M 5/0075* (2013.01); *G01M 7/025* (2013.01)

(58) Field of Classification Search
   CPC .... G01M 7/022; G01M 7/025; G01M 5/0066; G01M 5/0075; G01M 5/0025; G01M 5/0041
   USPC .......................... 73/669, 805, 811, 814, 847
   See application file for complete search history.

(56) References Cited

U.S. PATENT DOCUMENTS

| | | | | |
|---|---|---|---|---|
| 4,283,957 A * | 8/1981 | Zobrist | ................... | B06B 1/186 73/814 |
| 4,457,165 A * | 7/1984 | Wiederrich | ........... | G01L 5/0095 73/115.05 |
| 5,576,496 A * | 11/1996 | Carlini | ................ | G01M 13/025 73/121 |
| 7,165,465 B2 * | 1/2007 | De Lair | .............. | G01M 13/025 73/862.326 |
| 7,681,454 B2 * | 3/2010 | Rogg | .................... | G01M 17/04 73/669 |
| 7,921,713 B2 * | 4/2011 | Czoka | ................... | G01M 17/04 73/117.03 |
| 2006/0070461 A1 * | 4/2006 | Delair | ................. | G01M 13/027 73/862.325 |
| 2014/0033831 A1 * | 2/2014 | Matsumoto | ............. | G01L 3/108 73/862.338 |
| 2016/0341632 A1 | 11/2016 | Adams | | |

\* cited by examiner

*Primary Examiner* — Lisa M Caputo
*Assistant Examiner* — Rose M Miller
(74) *Attorney, Agent, or Firm* — Quinn IP Law

(57) ABSTRACT

A method of determining a noise or vibration response of a vehicle subassembly may include transmitting, via a controller, an input torque control signal to a first motor of a test apparatus. The first motor is mountable on a test fixture of the test apparatus and is configured to be coupled to the vehicle subassembly. The input torque control signal causes the first motor to provide an input torque characterized as a third derivative Gaussian function. The method further includes receiving a response of the vehicle subassembly to the input torque, and executing a control action with respect to the vehicle subassembly, via the controller, based on the response.

20 Claims, 3 Drawing Sheets

METHOD FOR DETERMINING A NOISE OR VIBRATION RESPONSE OF A VEHICLE SUBASSEMBLY AND TEST APPARATUS FOR SAME

TECHNICAL FIELD

The disclosure generally relates to a method for determining a noise and/or vibration response of a vehicle subassembly having torsional compliance, and a test apparatus for testing a noise of vibration response of a vehicle subassembly having torsional compliance.

BACKGROUND

Vehicle manufacturers strive to manufacture vehicles that will perform throughout their life within acceptable noise, vibration, and harshness standards. Vehicles, including automotive vehicles, include hundreds of individual components. Different subsets of the components may be subassembled with one another prior to final assembly in the vehicle and/or may be manufactured by different entities. Some vehicle subassemblies of components may have torsional compliance in that they experience some vibration or noise in response to torque inputs.

SUMMARY

In order to determine compliance with noise and vibration standards early in the design process, noise, vibration, and harshness characteristics of the various torsionally-compliant subassemblies of vehicle components must be accurately reproduced in an off-vehicle setting, such as in a lab test on a test apparatus. The present disclosure includes a method for determining a noise or vibration response of a vehicle subassembly as well as a test apparatus for testing the noise or vibration response and enables a more accurate reproduction by isolating the subassembly (e.g., the subassembly of connected components) to be tested to accurately focus on its response, and by providing an input torque to the isolated subassembly that more accurately represents in-use torque excitations that will be experienced by the subassembly when installed on the assembled vehicle. The method and test disclosed herein may ensure that vibration and noise response of the vehicle subassembly is within predetermined limits.

A method of determining a noise or vibration response of a vehicle subassembly is carried out on a test apparatus by a controller. The method may include transmitting, via the controller, an input torque control signal to a first motor of the test apparatus. The first motor is mountable on a test fixture and is configured to be coupled to the vehicle subassembly. The input torque control signal causes the first motor to provide an input torque characterized as a third derivative Gaussian function. The method further includes receiving a response of the vehicle subassembly to the input torque, and executing a control action with respect to the vehicle subassembly, via the controller, based on the response. As used herein, a controller may include one or more interconnected or separate controllers, and may include one or more data acquisition devices that receive and store test data. For example, a controller on the test apparatus may include a processor that provides motor commands, and may include a data acquisition device that receives sensor signals (such as accelerometer signals) indicative of a vibration response of the subassembly, and a separate controller may subsequently analyze the data received by the data acquisition device. The separate controller may be remote from the fixture and motors of the test apparatus and the controller connected to the motors, for example, and may analyze the data and perform one or more steps of the method disclosed herein at any point in time after the stored data is received by the data acquisition device.

In an aspect, the method may include comparing the response to a predetermined threshold value indicative of an unacceptable level of noise or vibration. The control action may be based on whether the response equals or exceeds the predetermined threshold value. For example, the predetermined threshold value may be a maximum magnitude of acceleration corresponding with a vibration or sound threshold. The predetermined threshold value is stored on the controller, and when the controller compares the response to the predetermined threshold value, executing the control action may include recording a diagnostic code if the response exceeds the predetermined threshold value. Furthermore, executing the control action may include rejecting the vehicle subassembly in a design validation process if the diagnostic code indicating non-compliance with the predetermined threshold is recorded. In the same embodiments or in other embodiments, the test apparatus may include a display operatively connected to the controller, and executing the control action may include sending a display signal that causes the display to display an indicator of whether the response exceeds the predetermined threshold value.

In an aspect, the test apparatus may include at least one accelerometer operatively connectable to the vehicle subassembly and to the controller, such as to a data acquisition (DAQ) device of the controller. The accelerometer may be configured to measure the response of the vehicle subassembly and output an accelerometer signal indicative of the response which may be received by the controller, such as by the DAQ.

In another aspect, the test apparatus may include a second motor mountable on the test fixture and configured to be coupled to the vehicle subassembly with the vehicle subassembly isolated between the first motor and the second motor. In such an embodiment, the method may further comprise transmitting, via the controller, a reaction torque control signal to the second motor. The reaction torque control signal may cause the second motor to provide an additional input torque to the vehicle subassembly, with the additional input torque opposing the input torque of the first motor. For example, the additional input torque provided by the second motor may be characterized as a torsion spring. This may be representative of reaction torque on one end of the vehicle subassembly when installed on the vehicle and when input torque is applied to an opposite end of the vehicle subassembly.

In an aspect, the torque inputs to the vehicle subassembly tested may be in accordance with some user-controlled inputs. Stated differently, the entity carrying out the testing may select the relative scales of the input torque of the first motor. For example, the input torque control signal of the first motor may correspond with a selected scaling factor indicative of a desired peak torque and a desired torque apply rate. The scaling factor may scale the ratio of the peak torque to the torque apply rate, while maintaining the third derivative Gaussian characteristic of the input torque of the first motor.

A test apparatus for testing a noise or vibration response of a vehicle subassembly may include a test fixture, a first motor mountable on the test fixture and configured to be coupled to the vehicle subassembly, a controller configured to execute stored instructions that characterize a noise or vibration response of the vehicle subassembly, executing the stored instructions causing the controller to transmit an input torque control signal to the first motor, with the input torque control signal causing the first motor to provide an input torque characterized as a third derivative Gaussian function. Executing the stored instructions may include receiving a response of the vehicle subassembly to the input torque, and executing a control action with respect to the vehicle subassembly based on the response.

The test apparatus may include at least one accelerometer operatively connectable to the vehicle subassembly and to the controller, and the accelerometer may be configured to measure the response of the vehicle subassembly and output an accelerometer signal indicative of the response. The vehicle subassembly may include a torsionally-compliant feature. The accelerometer may be operatively connectable to the vehicle subassembly at or adjacent to the torsionally-compliant feature. Such a position of the accelerometer may be a point of interest given that vibration and/or noise may have a greater magnitude at the torsionally-compliant feature than elsewhere on the vehicle subassembly.

The test apparatus may further include a second motor mountable on the test fixture and configured to be coupled to the vehicle subassembly with the vehicle subassembly isolated between the first motor and the second motor. The controller may transmit a reaction torque control signal to the second motor that causes the second motor to provide an additional input torque to the vehicle subassembly, the additional input torque may be characterized as a torsion spring and opposes the input torque of the first motor, as described above.

The controller may be operatively connectable to an operator input feature configured to enable an operator to select a scaling factor for the input torque control signal, the scaling factor corresponding with a ratio of peak torque to torque apply rate corresponding with a desired peak torque a desired torque apply rate as described above.

Accordingly, the performance of the controller in determining compliance with noise and/or vibration standards is improved by use of the more accurate input torque characterized as a third derivative Gaussian function. Similarly, the test apparatus is improved both by utilizing the controller that provides the third derivative Gaussian function torque input and by isolating the vehicle subassembly between the first motor and the second motor so that a torsionally-compliant feature of the vehicle subassembly receives the accurately-modeled torque input in the same manner as it would on the vehicle.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

Figure 1:
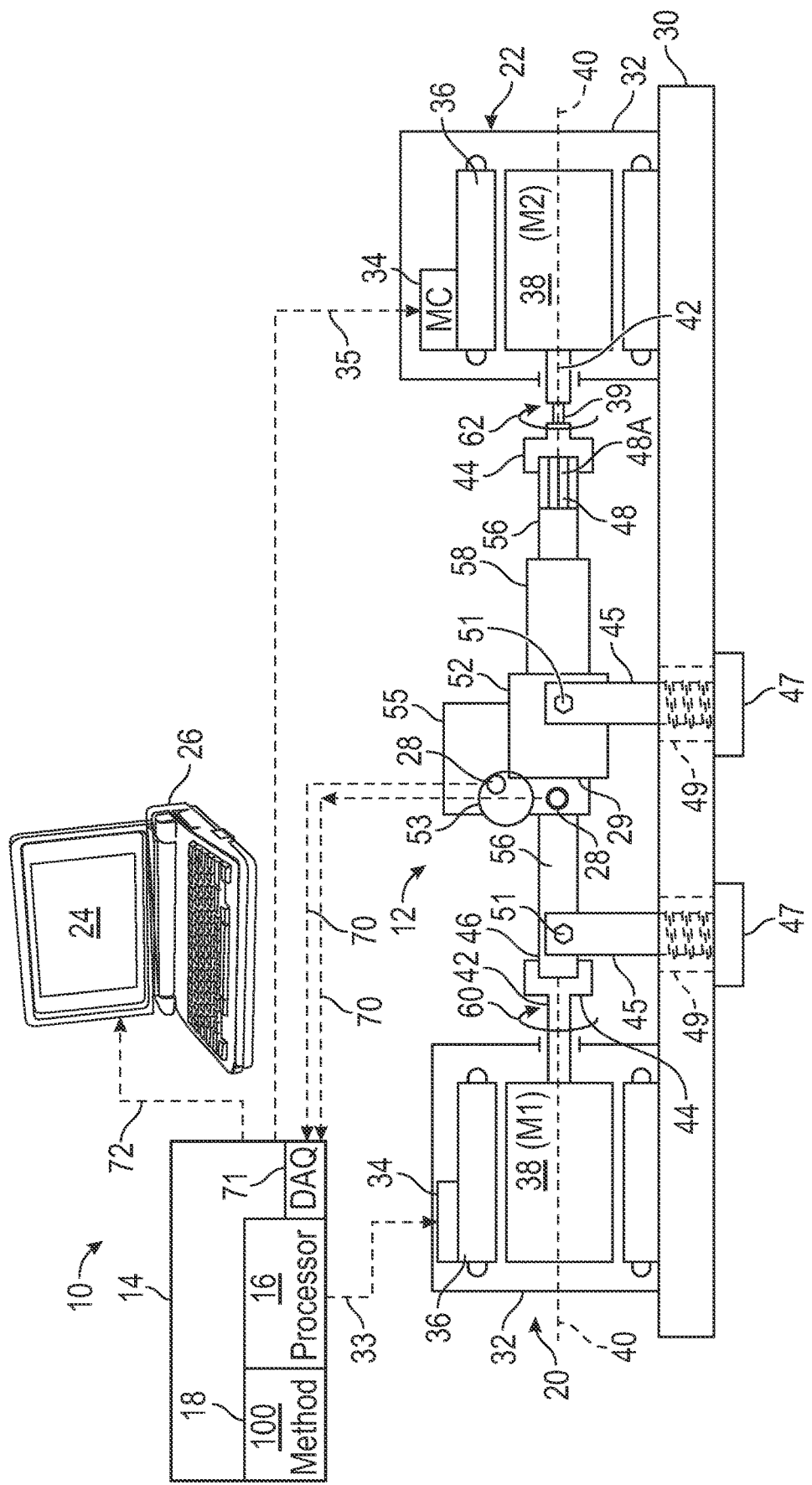
FIG. 1 is a schematic illustration of a test apparatus and a vehicle subassembly secured to the test apparatus for determining a noise and/or vibration response of the vehicle subassembly.

Referring to the drawings, wherein like reference numbers refer to like components throughout the views, FIG. 1 shows a test apparatus 10 with a vehicle subassembly 12 coupled to the test apparatus 10 in preparation for determining a noise and/or vibration response of the vehicle subassembly 12. The test apparatus 10 includes a controller 14 that is programmed to execute a set of stored instructions embodying a method 100 that elicits noise and/or vibration of the vehicle subassembly 12. As discussed herein, the test apparatus 10 enables the vehicle subassembly 12 to be isolated and the torque input to the vehicle subassembly 12 as commanded by the controller 14 according to the method 100 enables the noise or vibration response of the vehicle subassembly 12 to accurately represent the response of the vehicle subassembly 12 as if installed on a completed vehicle. In this manner, bench level testing (e.g., testing of the vehicle subassembly 12 on the test apparatus 10) can be carried out to determine compliance with design thresholds, enabling design revisions to the vehicle subassembly 12 to be accomplished early in the vehicle production process. For example, testing may occur even before manufacture of any completed vehicle on which like vehicle subassemblies are installed, or any time thereafter.

The controller 14, although schematically depicted as a single controller, may be implemented as one controller, or as a system of controllers in cooperation to collectively manage the test apparatus 10 and analyze data retrieved from the test apparatus indicative of a vibration response of the tested vehicle subassembly. Multiple controllers may be in communication via a serial bus (e.g., Controller Area Network (CAN)), via discrete conductors, or wirelessly. One or more of the controllers may be physically separate and remote from the test apparatus and may carry out some portion of the method related to evaluating the test data to determine whether the response of the tested vehicle subassembly is within predetermined vibration or noise limits and executing a control action (e.g., providing an indicator) of such a determination. For example, the controller 14 includes one or more digital computers each having a microprocessor or central processing unit (CPU), referred to herein as a processor 16, and memory 18, such as read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The one or more processor(s) 16 may include the stored, computer executable instructions of the method 100 (e.g., the instructions may be on the same processor of a single controller or some instructions may be on a processor of one controller while other instructions may be on a processor of another controller), and the instructions, when executed, cause the controller 14 to perform actions and issue commands that control the test apparatus 10 and provide an indicator of whether the vibration response of the vehicle subassembly is within predetermined limits, according to the method 100 disclosed in the present disclosure.

In addition to the controller 14, the test apparatus 10 may include the following components, each of which is operatively connected to the controller 14 as further described herein: a first motor (M1) 20, a second motor (M2) 22, a display 24, an operator input feature 26, and one or more accelerometers 28 to measure acceleration which is indicative of vibration and/or sound. The display 24 is depicted as an electronic screen, for example, and the operator input feature 26 is depicted as an electronic keyboard. The display 24 and operator input feature 26 may be operatively mounted to the fixture 30, may rest on a table (not shown), or may be embodied in a portable laptop, for example. The controller 14 or portions thereof may also be integrally included in a laptop with the display 24 and operator input feature 26 or may be separate therefrom. For example, the one or more accelerometers 28 may provide accelerometer signals to a data acquisition device (DAQ) 71 that is operatively connectable to the controller 14. Any such controller 14 included on the laptop may record data received from the DAQ 71, for example, and may also process the data according to the method 100, or the recorded data may be transferred to another controller of the one or more controllers 14 of a different computing device. Although shown operatively connected by transfer conductors (e.g., wires) in FIG. 1, operative connections between the controller 14 and the first motor (M1) 20, the second motor (M2) 22, the display 24, the operator input feature 26, and the one or more accelerometers 28 may be wireless.

The test apparatus 10 also includes a fixture 30 which may be a stationary base or platform. A respective housing 32 of each of the first motor 20 and the second motor 22 may be directly or indirectly fixedly mounted to the fixture 30 so that the motors 20, 22 are spaced apart from one another. For example, the housings 32 may be bolted to the fixture 30, which is sufficiently rigid to isolate vibrations caused during testing to the vehicle subassembly 12 or 12A being tested. As shown, each motor 20, 22 includes a motor controller (MC) 34 operatively connected to the controller 14 and configured to receive control signals from the controller 14 that control operation of the motor. For example, the first motor 20 receives an input torque control signal 33 causing an input torque $T_1$ as described herein, and the second motor 22 receives a reaction torque control signal 35 causing an input torque $T_2$ that is configured to hold the rotor 38 of the second motor 22 (and therefore the end of the subassembly 12 or 12A connected thereto) to an initial position as a reaction torque as described herein. For example, in testing a vehicle subassembly that is a steering column electric power steering assembly, the input torque $T_1$ represents torque applied to the steering column electric power steering assembly through other vehicle components, such as due to road loads, and the input torque $T_2$ represents the torque necessary to hold a steering wheel of the steering column electric power steering assembly in a given position despite the input torque $T_1$.

Each motor 20, 22 is depicted as having an annular stator 36 that surrounds a rotor 38 and causes the rotor 38 to rotate about an axis of rotation (A) 40 at a rotational speed and apply torque as commanded by the controller 14. In the embodiment shown, the respective axes of rotation 40 of each of the motors 20, 22 are shown as coaxial. In other arrangements, the respective axes of rotation 40 may be arranged as non-coaxial, and may be parallel or otherwise disposed in a manner that permits the vehicle subassembly 12 to be operatively secured to and extend between each of the motors 20, 22, with the torque applied by the first motor 20 in an opposite direction to the torque applied by the second motor 22.

As shown, a rotor hub 42 of each of the motors 20, 22 includes a coupling device 44, such as a clamp that secures to the vehicle subassembly 12. More specifically, a first location such as a first end 46 of the vehicle subassembly 12 is secured by the coupling device 44 to the rotor 38 of the first motor 20 and a second location spaced apart from the first location, such as a second end 48 of the vehicle subassembly 12 is secured by the coupling device 44 of the rotor 38 of the second motor 22. With this configuration, the vehicle subassembly 12 extends between the first motor 20 and the second motor 22. Each coupling device 44 is configured to prevent slip or other rotation of the vehicle subassembly 12 relative to the respective rotor 38 at the coupling device 44. As shown, the second end 48 is splined (e.g., has splines 48A). When installed on a vehicle, a steering wheel would be mounted at the splines 48A. Accordingly, a response of the vehicle subassembly 12 will be solely in response to the magnitude, direction, and frequency of the torque input from the motors 20, 22, and will be made to occur at the torsionally compliant feature(s) of the vehicle subassembly 12 between the two coupling devices 44. In some instances, the coupling devices 44 may be adjustable or expandable in length and width to enable coupling to a wide variety of different vehicle subassemblies 12. In some instances, the vehicle subassembly 12 may be rotatably or non-rotatably supported between the first motor 20 and the second motor 22 such as at bearings or supports extending from the fixture 30 and representative of other vehicle structure to which the vehicle subassembly 12 is connected to when installed on a vehicle. Two such supports 45 are shown extending threaded to T nuts 47 disposed in slots 49 of the fixture 30 and bolted to a shaft 56 and the steering column housing 52 described herein with bolts 51, as these locations are where the subassembly 12 would be joined to other vehicle structure when installed in a vehicle. Such supports aid in accurately representing an in-vehicle torsion response of the vehicle subassembly 12 when subjected to torque input such as that from either of the motors 20, 22.

Figure 2:
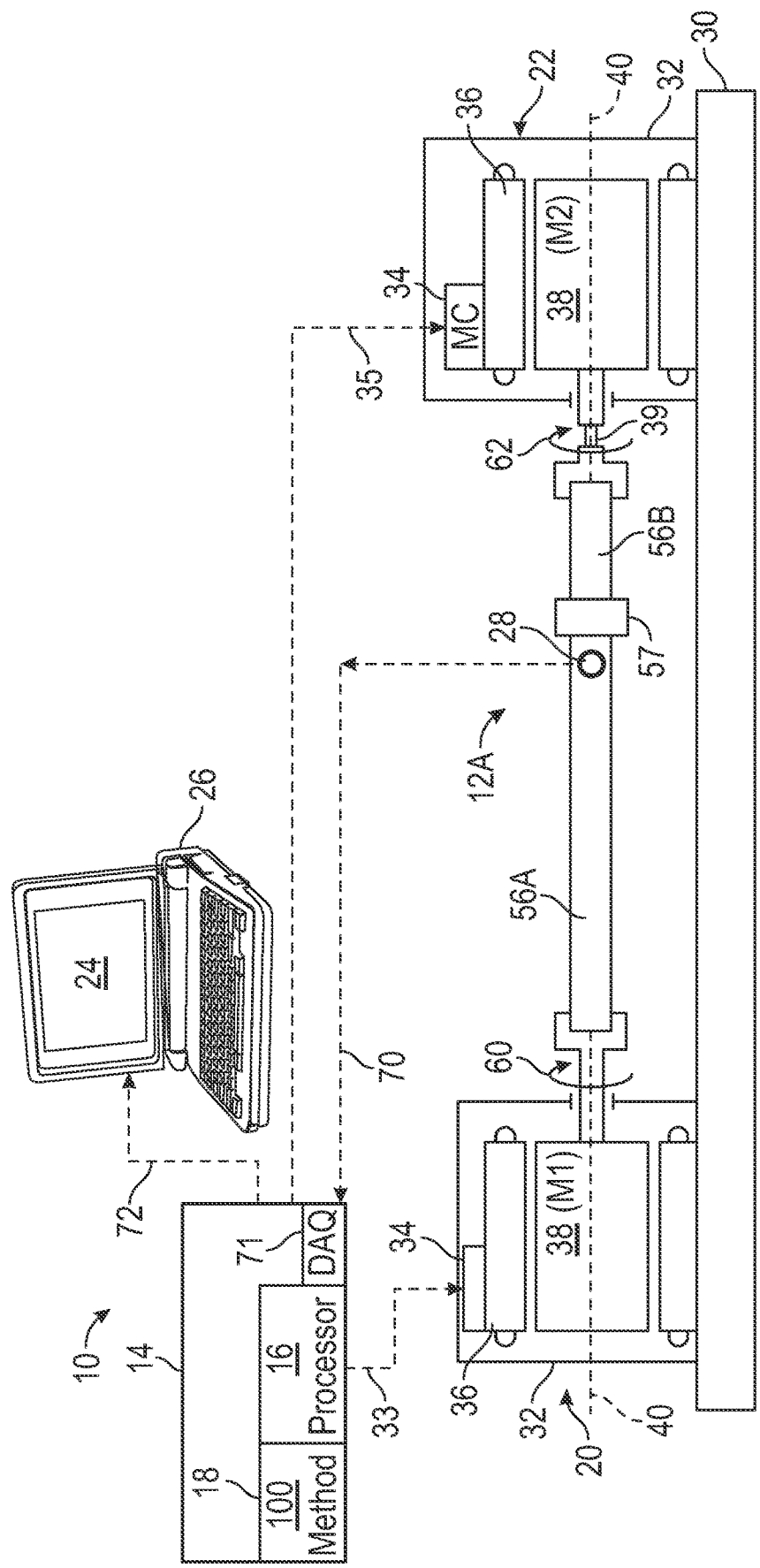
FIG. 2 is a schematic illustration of the test apparatus of FIG. 1 with a different vehicle subassembly secured to the test apparatus for determining a noise and/or vibration response of the vehicle subassembly.

The vehicle subassembly 12 is depicted as a steering column electric power steering assembly in FIG. 1 and may be referred to as such herein. However, it should be appreciated that a wide variety of vehicle subassemblies that experience at least some torsional compliance may be tested on the test apparatus. As used herein, a vehicle subassembly may include an assembly of multiple interconnected components. For example, certain vehicle components may be assembled (e.g., interconnected) to one another for eventual final assembly to other components in the vehicle during vehicle manufacture. The steering column electric power steering assembly shown as the vehicle subassembly 12 is one such example. The power steering assembly may include, for example, a steering column housing 52, a worm gear 53, an assist motor 55, a shaft 56 and a housing 58 through which the shaft 56 extends, among other components. An alternative vehicle subassembly 12A shown in FIG. 2 secured to the motors 20, 22 in the same test apparatus 10 is an example of an intermediate shaft having two shaft portions 56A, 56B connected via a joint 57 such as a U-joint or a constant velocity joint. In either instance, such assemblies of vehicle components may be evaluated on the test apparatus 10 for the noise and/or vibration response that results from their torsional compliance.

In order to measure the response of the vehicle subassembly 12 or 12A, the one or more accelerometers 28 are positioned on the vehicle subassembly 12 or 12A at or near torsionally-compliant features which are points of interest as such features are where noise or vibration is most likely to occur. For example, for a vehicle subassembly 12 comprised of multiple interconnected components, the accelerometers 28 may be positioned at or near torsionally-compliant features 29 such as couplings of two adjacent components to one another, whether such couplings are flanges, fasteners, gear meshes, etc., as such a such coupling may have some torsional compliance. One such torsionally-compliant feature 29 and accelerometer 28 is shown where the shaft 56 interfaces with the housing 52. An additional torsionally-compliant feature is the worm gear 53, and an additional accelerometer 28 is mounted on the worm gear 53. It should be appreciated that additional accelerometers 28 may be disposed at or near other torsionally-compliant features of the vehicle subassembly 12. For a vehicle subassembly 12A the one or more accelerometers 28 may be placed near the joint 57 connecting the shaft portions 56A, 56B, for example.

Figure 3:
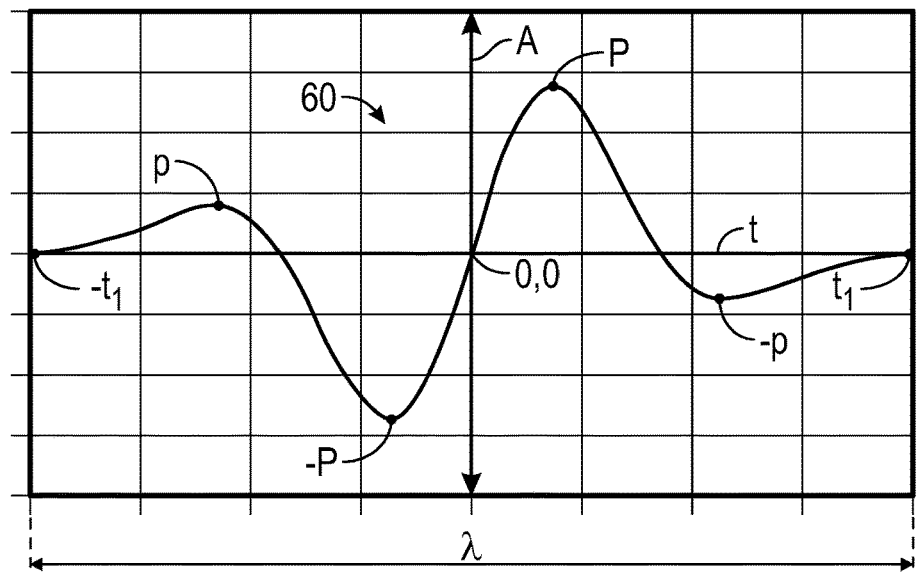
FIG. 3 is an example plot of a torque input of the test apparatus to the vehicle subassembly, showing torque on the vertical axis and time on the horizontal axis.

FIG. 3 represents a torque input ($T_1$) 60 applied to the vehicle subassembly 12 by the first motor 20 to elicit the noise or vibration response and is characterized as a third derivative Gaussian function. Responses on the test apparatus 10 best duplicate responses to in-vehicle torque inputs (e.g., from torque applied by other vehicle components with which the vehicle subassembly 12 is eventually connected when installed in the vehicle, or torque applied due to road inputs) when the amplitude (e.g., in Newton-meters) of the torque input over time (e.g., in seconds) of the first torque input $T_1$ of the first motor 20 is a third derivative Gaussian function waveform as set forth in Equation 1 (EQN 1) below:

$$T_1 = \frac{\partial^3 G(t, \sigma)}{\partial t^3} = -\frac{e^{\left(-\frac{t^2}{2\sigma^2}\right)} t(t^2 - 3\sigma^2)}{\sqrt{2\pi}\,\sigma^7} \quad \text{EQN. 1}$$

In EQN 1, t represents time, σ represents an inner scaling factor, and G represents the Gaussian function (e.g., a symmetric bell curve). The third derivative Gaussian function input torque wave has an initial, relatively small amplitude peak torque (p) in the positive direction of rotation (e.g., clockwise) followed by a relatively large amplitude (maximum amplitude) peak torque (−P) in the negative direction of rotation (e.g., counterclockwise), followed by a maximum amplitude peak torque (P) in the positive direction of rotation equal in magnitude but opposite in direction from the peak torque −P, and then followed by a relative small amplitude peak torque (−p) equal in magnitude to but opposite in direction from the relatively small peak torque (p).

Under some implementations of the method 100, the absolute value of the peak torque (P) (e.g., the maximum amplitude of the torque input $T_1$) and the inner scaling factor σ of the Gaussian function G may be selected by the operator running the test on the vehicle subassembly 12 using the test apparatus 10. Selection of the inner scaling factor σ varies the ratio of the resulting amplitude to wavelength of the resulting wavelet, acting as a scaling factor of amplitude (e.g., peak torque P) to wavelength (λ). For example, an operator of the test apparatus 10 may enter or select a numerical value of the peak torque (P) and the inner scaling factor σ using the operator input feature 26. Selecting a relatively low value of the inner scaling factor σ in comparison to that selected when generating the torque input 60 shown in FIG. 3 will result in a torque input with a shorter wavelength (e.g., with the wave compressed in the horizontal direction so that $t_1$ and −$t_1$ are closer to one another relative to their positions on the plot of FIG. 3) and torque apply rate is therefore increased. In contrast, selecting a relatively high value of the inner scaling factor σ in comparison to that selected when generating the torque input 60 shown in FIG. 3 will result in a torque input with a longer wavelength and lower torque apply rate (e.g., with the wave elongated in the horizontal direction so that $t_1$ and −$t_1$ are further from one another relative to their positions on the plot of FIG. 3). For example, in a base equation, the inner scaling factor σ may be selected to have a numerical value of 1, and the apply rate may be adjusted by changing the time scale. The inner scaling factor σ may not have a value of zero.

A reaction torque ($T_2$) 62 (described herein) opposing the third derivative Gaussian function input torque 60 is applied to another location on the vehicle subassembly 12 by the second motor 22. The reaction torque experienced by the vehicle subassembly 12 when finally assembled within a vehicle is best represented as a torsion spring with torque in a direction opposing that of the third derivation Gaussian torque input $T_1$. Accordingly, the controller 14 is configured to transmit a reaction torque control signal 35 to the second motor 22 that results in the second motor 22 applying an additional input torque $T_2$ (e.g., a second torque input $T_2$ of the second motor 22) to the vehicle subassembly 12 as a reaction torque in a rotational direction opposing that of the input torque of the first motor 20. The input torque $T_2$ applied by the second motor 22 has a magnitude (e.g., in Newton-meters) that increases with angular rotation according to the formula of a torsion spring in Equation 2 (EQN. 2) as follows:

$$T_2 = -k\theta \quad \text{EQN. 2}$$

In EQN. 2, k is a spring constant and θ is the angle of twist of the vehicle subassembly 12 from its equilibrium position, as may be determined by the accelerometer 28 disposed at or near the torsionally-compliant feature, such as the coupling device 44.

With the vehicle subassembly 12 clamped or otherwise secured to and extending between the two motors 20, 22, the one or more torsionally-compliant features of the vehicle subassembly 12 are located between the two torque inputs, and the noise and vibration induced in the vehicle subassembly 12 by the first and second torque inputs $T_1$ and $T_2$ at the torsionally-compliant features accurately represent that which occurs when the vehicle subassembly 12 is installed on a vehicle. The one or more accelerometers 28 output an accelerometer signal 70 to the controller 14 that is indicative of the noise and/or vibration response of the vehicle subassembly 12 (e.g., the acceleration thereof) to the input torque $T_1$.

Figure 4:
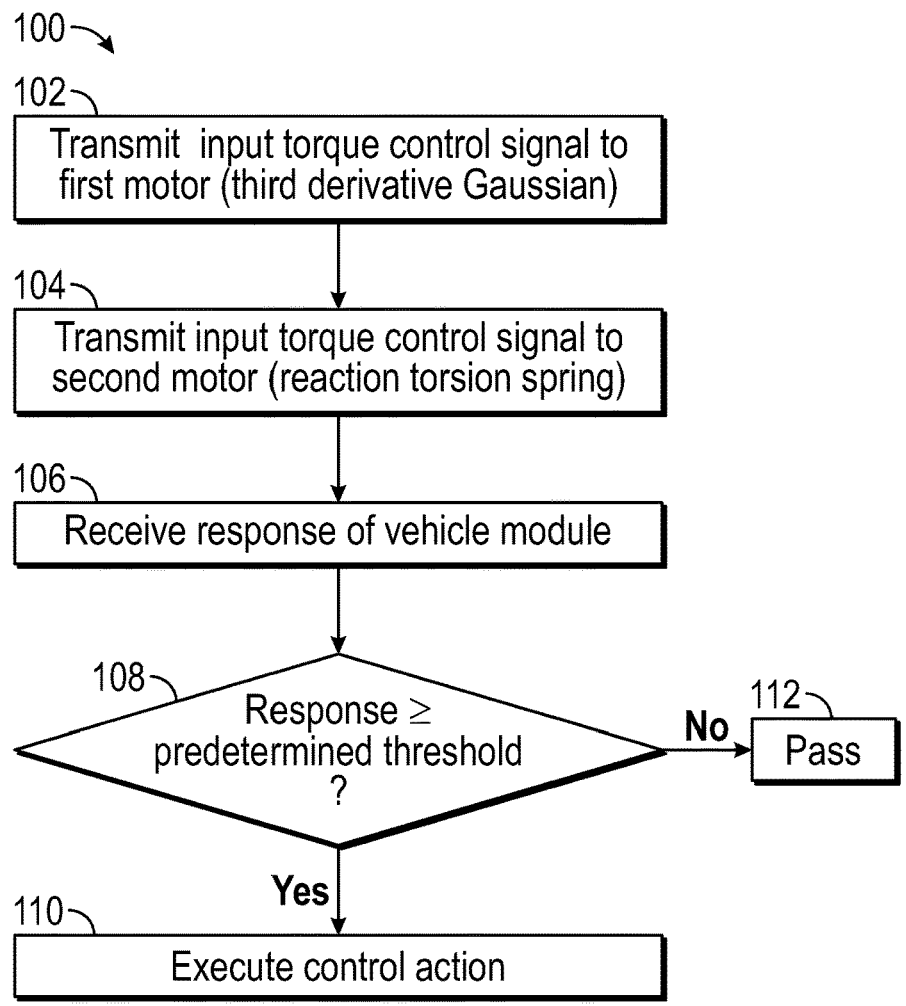
FIG. 4 is a flow chart showing an example method of determining a noise and/or vibration response of a vehicle subassembly as implemented by the test apparatus of FIGS. 1 and 2.

FIG. 4 is a flow chart that represents the method 100 of determining a noise or vibration response of the vehicle subassembly 12, 12A, etc., as carried out by the controller 14 with the vehicle subassembly 12 on the test apparatus 10. As discussed herein, the controller 14 may include multiple controllers, and different portions (e.g., steps) of the method 100 may be carried out by different ones of the controllers. The method 100 may begin with step 102, transmitting, via the controller 14, the input torque control signal 33 to the first motor 20 of the test apparatus 10 to apply the input torque $T_1$ as a third derivative Gaussian function as described herein. The applied input torque $T_1$ may correspond with an operator-selected torque apply rate and inner scaling factor indicative of a desired peak torque and a desired torque apply rate as described herein, such as may be entered by the operator with the operator input feature 26.

Concurrently with step 102, the method 100 may include step 104, transmitting, via the controller 14, the reaction torque control signal 35 to the second motor 22 to apply the input torque $T_2$ as a torsion spring reaction torque as described herein. The applied input torque $T_2$ may correspond with an operator-selected spring rate k as described herein, such as may be entered by the operator with the operator input feature 26 or as may be calculated by the controller 14 based on the applied input torque $T_1$. Alternatively or in addition, a physical rod 39 may be included in the second motor 22 (e.g., such as part of the rotor hub 42) that varies in spring rate when torque is applied. In the example in which the vehicle subassembly 12 is a steering column electric steering column assembly, the spring rate of the physical rod 39 may be representative of the torque a driver would apply to hold at center (e.g., without rotating) a steering wheel included in or attached to the steering column electric steering column assembly.

In step 106 of the method 100, the controller 14 may receive a response of the vehicle subassembly 12 to the input torque $T_1$ and $T_2$, such as by receiving the one or more accelerometer signals 70 output from the one or more accelerometers 28 to the controller 14. In some examples, the controller 14 may receive the accelerometer signal 70 indirectly, as recorded data provided by the DAQ 71 which directly receives the accelerometer signal 70.

Based on the accelerometer signal 70, which is indicative of both the vibration and the noise that the vehicle subassembly 12 experiences at the torsionally-compliant feature, the method 100 can compare the response of the vehicle subassembly 12 to a predetermined threshold value indicative of an unacceptable level of noise or vibration in step 108. For example, the vibration as indicated by the accelerometer signal 70 can be compared to predetermined threshold value of a maximum magnitude of acceleration resulting from the input torque. Similarly, the accelerometer signal 70 may be indicative of the vibration in g-force (g) of the vehicle subassembly 12 at the torsionally-compliant feature 29 in response to the torque input $T_1$ and can be compared by the controller 14 to a predetermined threshold value of a maximum magnitude of vibration resulting from the input torque (e.g., rattle).

If it is determined in step 108 that the response of the vehicle subassembly 12 exceeds the predetermined threshold value, then the method 100 may move to step 110 and execute a control action. The control action need not be executed on the vehicle subassembly 12 or 12A in the test setup, but may instead be a control action executed for diagnostic purposes. For example, the control action may include recording a diagnostic code or otherwise indicating when the response exceeds the predetermined threshold value. Furthermore, executing the control action in step 110 may include rejecting the vehicle subassembly 12 in a design validation process when the diagnostic code or other indicator of failure of the vehicle subassembly 12 to meet a predetermined threshold standard is recorded or otherwise indicated. Stated differently, the diagnostic code may be the code for a rejection of the subassembly 12. As an alternative or in addition, executing the control action in step 110 may include the controller 14 sending a display signal 72 (see FIG. 1) that causes the display 24 to display an indicator of whether the response exceeds the predetermined threshold value. For example, if the response of the vehicle subassembly 12 exceeds the predetermined threshold value, then the control action of step 110 may be a diagnostic code or other alert displayed on the display 24 indicating the failure of the vehicle subassembly 12 to meet predetermined vibration or noise limits. If it is determined in step 108 that the vibration and noise response of the vehicle subassembly 12 to the input torque $T_1$ and $T_2$ is within acceptable limits (e.g., less than predetermined threshold values), then the method may move to step 112 in which a control action is executed by the controller 14, such as generating a diagnostic code recorded or a display shown that is indicative of the noise and vibration response of the subassembly 12 "passing" the test carried out on the test apparatus 10, e.g., the response being less than the predetermined noise and vibration thresholds. As previously discussed, such a control action may occur in real time during testing, or may occur after later analyzing stored test data, such as on a remote controller 14 separate from the controller 14 that controls the motors 20 and 22.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method of determining a noise or vibration response of a vehicle subassembly on a test apparatus, the method comprising:
   transmitting, via a controller, an input torque control signal to a first motor of the test apparatus, the test apparatus further including the controller and a test fixture, the first motor mountable on the test fixture and configured to be coupled to the vehicle subassembly;
   wherein the input torque control signal causes the first motor to provide an input torque characterized as a third derivative Gaussian function;
   receiving a response of the vehicle subassembly to the input torque; and
   executing a control action with respect to the vehicle subassembly, via the controller, based on the response.

2. The method of claim 1, further comprising:
   comparing the response to a predetermined threshold value indicative of an unacceptable level of noise or vibration; and
   wherein the control action is based on whether the response equals or exceeds the predetermined threshold value.

3. The method of claim 2, wherein the predetermined threshold value is a magnitude of acceleration.

4. The method of claim 2, wherein executing the control action includes recording a diagnostic code if the response exceeds the predetermined threshold value.

5. The method of claim 4, wherein executing the control action includes rejecting the vehicle subassembly in a design validation process if the diagnostic code is recorded.

6. The method of claim 2, wherein:
   the test apparatus includes a display operatively connectable to the controller; and
   executing the control action includes sending a display signal to the display that causes the display to display an indicator on the display of whether the response exceeds the predetermined threshold value.

7. The method of claim 1, wherein:
the test apparatus includes at least one accelerometer operatively connectable to the vehicle subassembly and to the controller;
the accelerometer is configured to measure the response of the vehicle subassembly and output an accelerometer signal indicative of the response; and
receiving the response of the vehicle subassembly to the input torque includes receiving the accelerometer signal.

8. The method of claim 1, wherein the test apparatus includes a second motor mountable on the test fixture and configured to be coupled to the vehicle subassembly with the vehicle subassembly isolated between the first motor and the second motor, and the method further comprising:
transmitting, via the controller, a reaction torque control signal to the second motor;
wherein the reaction torque control signal causes the second motor to provide an additional input torque to the vehicle subassembly, the additional input torque opposing the input torque of the first motor.

9. The method of claim 8, wherein the additional input torque provided by the second motor is characterized as a torsion spring.

10. The method of claim 9, wherein the second motor includes a rod through which the additional input torque is provided, the rod having a selected spring rate.

11. The method of claim 1, wherein the input torque control signal corresponds with a selected scaling factor indicative of a desired peak torque and a desired torque apply rate.

12. A test apparatus for testing a noise or vibration response of a vehicle subassembly, the test apparatus comprising:
a test fixture;
a first motor mountable on the test fixture and configured to be coupled to the vehicle subassembly;
a controller configured to execute stored instructions that characterize a noise or vibration response of the vehicle subassembly, executing the stored instructions causing the controller to:
transmit an input torque control signal to the first motor; wherein the input torque control signal causes the first motor to provide an input torque characterized as a third derivative Gaussian function;
receive a response of the vehicle subassembly to the input torque; and
execute a control action with respect to the vehicle subassembly based on the response.

13. The test apparatus of claim 12, wherein:
executing the stored instructions further causes the controller to compare the response to a predetermined threshold value indicative of an unacceptable level of noise or vibration; and
executing the control action includes recording a diagnostic code if the response equals or exceeds the predetermined threshold value.

14. The test apparatus of claim 13, wherein executing the control action includes rejecting the vehicle subassembly in a design validation process if the diagnostic code is recorded.

15. The test apparatus of claim 13, wherein:
the test apparatus includes a display operatively connected to the controller; and
executing the control action includes comparing the response to a predetermined threshold value indicative of an unacceptable level of noise or vibration, and sending a display signal that causes the display to display an indicator of whether the response exceeds the predetermined threshold value.

16. The test apparatus of claim 12, further comprising:
at least one accelerometer operatively connectable to the vehicle subassembly and to the controller;
wherein the accelerometer is configured to measure the response of the vehicle subassembly and output an accelerometer signal indicative of the response; and
wherein receiving the response of the vehicle subassembly to the input torque includes receiving the accelerometer signal.

17. The test apparatus of claim 16, wherein:
the vehicle subassembly includes a torsionally-compliant feature; and
the at least one accelerometer is operatively connectable to the vehicle subassembly at or adjacent to the torsionally-compliant feature.

18. The test apparatus of claim 12, further comprising:
a second motor mountable on the test fixture and configured to be coupled to the vehicle subassembly with the vehicle subassembly isolated between the first motor and the second motor; and
wherein executing the stored instructions further causes the controller to transmit a reaction torque control signal to the second motor; wherein the reaction torque control signal causes the second motor to provide an additional input torque to the vehicle subassembly, the additional input torque opposing the input torque of the first motor.

19. The test apparatus of claim 18, wherein the additional input torque provided by the second motor is characterized as a torsion spring.

20. The test apparatus of claim 12, wherein the test apparatus has an operator input feature operatively connected to the controller and configured to enable an operator to select a scaling factor for the input torque control signal, the scaling factor corresponding with a desired peak torque and torque apply rate.

* * * * *